UNITED STATES PATENT OFFICE.

JESSE A. DUBBS, OF PITTSBURG, PENNSYLVANIA, ASSIGNOR OF ONE-HALF TO JAMES H. WHITE, OF SAME PLACE.

ASPHALTUM AND METHOD OF MANUFACTURING SAME.

SPECIFICATION forming part of Letters Patent No. 608,372, dated August 2, 1898.

Application filed September 17, 1896. Serial No. 606,142. (No specimens.)

*To all whom it may concern:*

Be it known that I, JESSE A. DUBBS, a citizen of the United States, residing at Pittsburg, in the county of Allegheny and State of Pennsylvania, have invented or discovered a certain new and useful Improvement in Asphaltum and the Method of Manufacturing the Same, of which improvement the following is a specification.

In Letters Patent No. 468,867, dated February 16, 1892, and Nos. 480,234 and 480,235, dated August 2, 1892, I have described and claimed a method of treating hydrocarbons having a paraffin base—*i. e.*, petroleum or residuums thereof—for the production of an asphaltum which is similar to the natural asphaltum found in the island of Trinidad and other places. In the course of a series of experiments I have discovered that hydrocarbons having an asphalt base—*i. e.*, a natural product known as "maltha" or "mineral" tar—may by suitable treatment be transformed into asphaltum.

In general terms the invention consists in the method of treatment substantially as hereinafter described and claimed.

In the practice of my invention the maltha or mineral tar is placed in a suitable still or retort together with sulfur, either in a solid or fluid condition or in the form of a chemical combination with other elements, as calcium sulfid or pyrites, &c. It is preferred, however, to heat the maltha or mineral tar sufficiently to drive off moisture before adding the sulfur, as the presence of the moisture prevents the raising of the charge to a temperature of about 250° Fahrenheit and upward, favorable to the rapid combination of the sulfur with the charge. The sulfur is added in about the proportion of half a pound of sulfur to each gallon of the maltha or mineral tar; but these proportions will be dependent upon the specific gravity of the maltha or mineral tar. At about 10° Baumé scale I have found that about a half of a pound of sulfur, more or less, gives the best results; but when the maltha has a lower specific gravity less sulfur is required; and, on the other hand, when maltha having a higher specific gravity is used the amount of sulfur added is proportionally increased. The charge is preferably maintained at about 250° Fahrenheit until sulfureted hydrogen begins to come off, when the heat should, for the rapid production of asphaltum, be raised. The temperature to which the charge is raised is dependent upon the desired rate of gasification—*i. e.*, the facilities of the plant for taking care of the sulfureted hydrogen, which should not be allowed to escape in the air on account of well-known objectionable features.

The proportions of maltha and sulfur above given are suitable for the production of paving material; but when a harder asphalt is desired for paint or other purposes a greater proportion of sulfur should be added—as, for example, when preparing material for paint about one pound, more or less, is added to maltha having a specific gravity of about 10° Baumé and such proportion will be varied in accordance with changes in specific gravity, as above stated.

The maltha or mineral tar as it is charged in the retort or still is composed in part of saturated hydrocarbons represented by the general formula $CnHn_2+n_2$, $CnHn_2$. The sulfur combines with that proportion of the hydrogen (represented by $2n$) which renders the charge saturated, forming sulfureted hydrogen ($H_2S$.) The material remaining in the still after the sulfureted hydrogen has been driven off is represented by the general formula $CnHn_2+n_2$, $CnHn_2$ or an unsaturated hydrocarbon, such as forms the harder and more stable asphalts.

It is characteristic of maltha that it contains an element known as "asphaltine," which when the maltha has been treated as above described renders the resulting asphaltum tough. In order to increase the proportions of this asphaltine in the finished product, the maltha is subjected to a distilling operation to drive off its more volatile constitutents, and thereby correspondingly increase the proportion of asphaltine, before adding the sulfur in the manner described. This treatment renders the maltha asphaltum much tougher and more durable than the natural or the Pittsburg asphaltum.

The asphaltum produced by the foregoing method has most of the characteristics of Trinidad or Pittsburg asphaltum—*i.e.*, that manufactured in accordance with the patents referred to—but can be readily distinguished from such asphaltums by its brilliant black, while the Trinidad asphaltum has a brownish-black surface and the Pittsburg asphaltum has a dead lusterless black surface. The maltha asphaltum is further distinguished by the fact that at about 60° or 70° Fahrenheit it can be pulled out or extended to a stringy condition without fracture, while Trinidad or Pittsburg asphaltum will break when subjected to a pull at the same temperature. If a piece of maltha asphaltum be struck against a sharp edge, at the temperature stated, it will be broken at the point of impact without the splintering which is characteristic of Trinidad asphaltum when subjected to a similar test. As is well known, maltha or mineral tar has a peculiar odor by which it can be distinguished from other hydrocarbons. This peculiar odor is found in the asphaltum produced from maltha and distinguishes it from all other like materials.

I claim herein as my invention—

1. The herein-described method of manufacturing asphaltum, which consists in mixing maltha, or mineral tar, and sulfur in about the proportions stated, and subjecting the mixture to sufficient heat to effect a combination of the sulfur and hydrogen, and driving off the sulfureted hydrogen, substantially as set forth.

2. The method of manufacturing asphaltum, which consists in subjecting maltha or mineral tar to sufficient heat to drive off a portion of its volatile constituents, adding sulfur in about the proportions stated and subjecting the mingled materials to sufficient heat to effect a combination of the sulfur and hydrogen and driving off the sulfureted hydrogen, substantially as set forth.

3. An asphaltum substantially as described, produced from maltha and having the distinguishing characteristics that it is brilliantly black, that it can at 60° or 70° Fahrenheit be pulled out to a stringy condition without fractures, and that it has the peculiar odor of maltha or mineral tar.

In testimony whereof I have hereunto set my hand.

JESSE A. DUBBS.

Witnesses:
DARWIN S. WOLCOTT,
F. E. GAITHER.